United States Patent [19]

Hermans et al.

[11] Patent Number: 5,348,620
[45] Date of Patent: Sep. 20, 1994

[54] METHOD OF TREATING PAPERMAKING FIBERS FOR MAKING TISSUE

[75] Inventors: Michael A. Hermans; Robert J. Makolin, both of Neenah; Kristin A. Goerg; Fung-Jou Chen, both of Appleton, all of Wis.

[73] Assignee: Kimberly-Clark Corporation, Neenah, Wis.

[21] Appl. No.: 993,190

[22] Filed: Dec. 18, 1992

Related U.S. Application Data

[63] Continuation-in-part of Ser. No. 870,648, Apr. 17, 1992, abandoned.

[51] Int. Cl.$^5$ .............................................. D21C 9/00
[52] U.S. Cl. .......................................... 162/9; 162/56; 162/111; 162/147
[58] Field of Search ............... 162/9, 18, 4, 28, 56, 162/111, 112, 147, 187

[56] References Cited

U.S. PATENT DOCUMENTS

| | | | |
|---|---|---|---|
| 3,382,140 | 5/1968 | Henderson et al. | 162/56 |
| 3,445,329 | 5/1969 | West et al. | 162/187 |
| 3,773,613 | 11/1973 | Lee et al. | 162/191 |
| 3,994,771 | 11/1976 | Morgan, Jr. et al. | 162/113 |
| 4,036,679 | 7/1977 | Back et al. | 162/9 |
| 4,166,001 | 8/1979 | Dunning et al. | 162/111 |
| 4,174,417 | 11/1979 | Rydell | 428/221 |
| 4,455,195 | 6/1984 | Kinsley | 162/13 |
| 4,455,237 | 6/1984 | Kinsley | 210/767 |
| 4,488,932 | 12/1984 | Eber et al. | 162/9 |
| 4,668,339 | 5/1987 | Terry | 162/4 |
| 4,894,118 | 1/1990 | Edwards et al. | 162/147 |
| 4,902,382 | 2/1990 | Sakabe et al. | 162/175 |
| 4,923,565 | 5/1990 | Fuentes et al. | 162/72 |
| 4,969,976 | 11/1990 | Reed | 162/164.3 |
| 4,976,819 | 12/1990 | Minton | 162/9 |
| 4,999,084 | 3/1991 | Lang et al. | 162/9 |
| 5,102,501 | 4/1992 | Eber et al. | 162/111 |
| 5,176,793 | 1/1993 | Kurtz | 162/56 |

FOREIGN PATENT DOCUMENTS

| | | | |
|---|---|---|---|
| 1089273 | 11/1980 | Canada | 162/28 |
| 0312512 | 4/1989 | European Pat. Off. | D21F 11/04 |
| 0427317 | 5/1991 | European Pat. Off. | D06M 13/192 |
| 1761864 | 9/1971 | Fed. Rep. of Germany | D21B 1/12 |
| 2413278 | 9/1975 | Fed. Rep. of Germany | D21B 1/02 |
| 2494735 | 5/1982 | France | D21C 5/02 |
| 5-23262 | 2/1993 | Japan . | |
| 2172525 | 9/1986 | United Kingdom | B03B 1/00 |

*Primary Examiner*—Peter Chin
*Attorney, Agent, or Firm*—Gregory E. Croft

[57] ABSTRACT

The throughdryability of dewatered, but wet, sheets made from papermaking fibers can be significantly increased by subjecting an aqueous suspension of the fibers at high consistency to elevated temperatures with sufficient working of the fibers. Such a treatment is particularly effective for improving the efficiency of throughdrying processes used in the manufacture of certain products, such as tissues and paper towels, made from furnishes having a significant amount of secondary or recycled fibers.

18 Claims, 6 Drawing Sheets

METHOD OF TREATING PAPERMAKING FIBERS FOR MAKING TISSUE

This application is a continuation-in-part of copending U.S. patent application Ser. No. 07/870,648, filed Apr. 17, 1992, now abandoned.

BACKGROUND OF THE INVENTION

In the manufacture of certain paper sheet products, such as tissue and paper towels, one method of drying the sheet after formation and dewatering is to pass heated air through the wet sheet in a process well known in the papermaking art as throughdrying. Throughdrying is advantageous in that it minimizes compaction of the web and thereby produces a bulkier product compared to conventional wet press manufacturing processes, which rely on high levels of compression of the wet web and on a Yankee dryer to dry the web. However, throughdrying has some disadvantages in that it requires a substantial amount of expensive equipment and energy to carry out the drying process. In particular, the drying efficiency of the throughdrying process is in large part dependent upon the air permeability of the wet sheet which permits the hot air to pass therethrough. Air permeability is especially a problem for sheets made from fiber furnishes containing secondary (recycled) fibers, which inherently impart poor air permeability to the wet sheets into which they are incorporated. With the continual efforts to utilize more secondary fibers in paper products for environmental reasons, there is a need to improve the throughdryability of secondary papermaking fibers.

SUMMARY OF THE INVENTION

It has been surprisingly discovered that the ease in which secondary papermaking fibers can be through-dried can be improved by pre-treating the fibers of the papermaking furnish in a mechanical process in which the fibers are appropriately worked while suspended in a high consistency aqueous slurry. The effectiveness of the pretreatment is manifested by an increase of the Throughdryability Index (hereinafter defined and referred to as the "TD Index") of the fibers. An increase in the TD Index translates into faster throughdrying machine speeds for a given furnish and basis weight, which results in improved operating efficiency. The method of this invention can be utilized for any papermaking fibers, but is especially advantageous for improving the TD Index of secondary fiber furnishes. In some cases, the TD Index of secondary fiber furnishes can be surprisingly improved beyond that of untreated virgin furnishes.

In addition, while the fiber treatment of this invention is particularly advantageous for throughdrying processes and products, product improvements can also be realized when the treated fibers of this invention are used for making wet pressed tissue products as well. More specifically, it has been found that substituting the treated fibers of this invention for a portion of the fibers of a given tissue furnish, the softness of the resulting tissue can be increased without loss of strength. This is especially effective when treating hardwood fibers and combining the treated hardwood fibers with other fibers, such as untreated softwood fibers, either blended or layered. The treated hardwood fibers improve the softness of the resulting product while the untreated softwood fibers retain the strength. Softness can be further enhanced by adding a softening agent to the treated fibers either before treatment or after treatment. Certain softening agents also provide an unexpected increase in bulk as well as enhancing the softness of the tissue.

Hence in one aspect, the invention resides in a method of making a tissue comprising: (a) forming an aqueous suspension of papermaking fibers having a consistency (dry weight percent fibers in the aqueous suspension) of about 20 or greater; (b) passing the aqueous suspension through a shaft disperger at a temperature of 75° F. or greater with a power input of at least about 1 horsepower-day per ton of dry fiber, wherein the TD Index of the fibers is increased about 25 percent or greater, preferably about 50 percent or greater, and more preferably about 75 percent or greater; (c) feeding the fibers through a tissue making headbox to form a wet web; and (d) drying the web, such as by throughdrying, to form a dried tissue.

In another aspect, the invention resides in a method of making tissue comprising: (a) forming an aqueous suspension of papermaking fibers having a consistency of about 20 or greater; (b) passing the aqueous suspension through a shaft disperger at a temperature of 75° F. or greater with a power input of at least about 1 horsepower-day per ton of dry fiber, wherein the TD Index of the fibers is about 0.15 or greater, preferably about 0.2 or greater, more preferably about 0.3 or greater, and most preferably about 0.5 or greater; (c) feeding the fibers through a tissue making headbox to form a wet web; and (d) drying the web, such as by throughdrying, to form a dried tissue.

In a further aspect, the invention resides in a throughdried sheet made from a furnish comprising at least about 25 dry weight percent secondary fibers, said furnish having a TD Index of about 0.15 or greater, preferably about 0.20 or greater, more preferably about 0.33 or greater, and most preferably about 0.5 or greater. The amount of secondary fibers in the furnish can be anywhere within the range of about 25 to about 50, 75, or 100 dry weight percent.

Papermaking fibers useful for purposes of this invention include any cellulosic fibers which are known to be useful for making paper, particularly those fibers useful for making relatively low density tissue papers such as facial tissue, bath tissue, dinner napkins, paper towels, and the like. As used herein, the term "tissue" is used generically and is intended to include all such products. Such products can be creped or uncreped. The most common papermaking fibers include virgin softwood and hardwood fibers, as well as secondary or recycled cellulosic fibers. As used herein, "secondary fiber" means any cellulosic fiber which has previously been isolated from its original matrix via physical, chemical or mechanical means and, further, has been formed into a fiber web, dried to a moisture content of about 10 weight percent or less and subsequently reisolated from its web matrix by some physical, chemical, or mechanical means. Fibers which have been passed through a shaft disperger as described herein are sometimes referred to as "dispersed fibers".

The basis weight of the throughdried sheet can be from about 5 to about 50, preferably from about 10 to about 40, and more preferably from about 20 to about 30 grams per square meter. It will be appreciated that lower basis weight sheets inherently have greater permeability for a given furnish. Hence the greatest advantage of this invention is obtained with relatively higher basis weights where the sheets are normally more difficult to throughdry. The invention is particularly suitable for making throughdried single-ply bath tissue having a basis weight of about 25 grams per square meter.

The consistency of the aqueous suspension which is subjected to the treatment of this invention must be high enough to provide significant fiber-to-fiber contact or working which will alter the surface properties of the treated fibers. Specifically, the consistency can be at least about 20, more preferably from about 20 to about 60, and most preferably from about 30 to about 50 dry weight percent. The consistency will be primarily dictated by the kind of machine used to treat the fibers. For some rotating shaft dispergers, for example, there is a risk of plugging the machine at consistencies above about 40 dry weight percent. For other types of dispergers, such as the Bivis machine (commercially available from Clextral Company, Firminy Cedex, France), consistencies greater than 50 can be utilized without plugging. It is desirable to utilize a consistency which is as high as possible for the particular machine used.

The temperature of the fibrous suspension can be above room temperature, specifically 75° F. or greater, more specifically about 100° F. or greater, preferably about 150° F. or greater, more preferably about 210° F. or greater, and more preferably about 220° F. or greater. In general, higher temperatures are better for increasing the TD Index. The upper limit on the temperature is dictated by whether or not the apparatus is pressurized, since the aqueous fibrous suspensions within apparatus operating at atmospheric pressure cannot be heated beyond the boiling point of water.

The amount of power applied to the fibrous suspension also impacts the resulting TD Index. In general, increasing the power input will increase the TD Index. However, it has also been found that the improvement (increasing) of the TD Index falls off upon reaching a power input of about 2 horsepower-days per ton (HPD/T) of dry fiber in suspension. A preferred range of power input is from about 1 to about 3 HPDZT, more preferably about 2 HPDZT or greater.

The working of the fibers, such as by shearing and compression, is not known to be quantifiable in any meaningful way other than by the temperature and power input and the resulting TD Index. However, it is necessary that the fibers experience substantial fiber-to-fiber rubbing or shearing as well as rubbing or shearing contact with the surfaces of the mechanical devices used to treat the fibers. Some compression, which means pressing the fibers into themselves, is also desireable to enhance or magnify the effect of the rubbing or shearing of the fibers. The measure of the appropriate amount of shearing and compression to be used lies in the end result, which is the achievement of an increased TD Index. A number of shaft dispergers or equivalent mechanical devices known in the papermaking industry can be used to achieve varying degrees of the desired results. Suitable shaft dispergers include, without limitation, nonpressurized shaft dispergers and pressurized shaft dispergers such as the Bivis machines and the like.

If softening agents are used to enhance the softness of the final tissue product, suitable agents include, without limitation, fatty acids, waxes, quaternary ammonium salts, dimethyl dihydrogenated tallow ammonium chloride, quaternary ammonium methyl sulfate, carboxylated polyethylene, cocamide diethanol amine, coco betaine, sodium lauroyl sarcosinate, partly ethoxylated quaternary ammonium salt, distearyl dimethyl ammonium chloride, and the like. Examples of suitable commercially available chemical softening agents include, without limitation, Berocell 596 and 584 manufactured by Eka Nobel Inc., Adogen 442 manufactured by Shearex Chemical Company, Quasoft 203 manufactured by Quaker Chemical Company, and Arquad 2HT-75, manufactured by Akzo Chemical Company.

The Throughdryability Index

During throughdrying, it is generally understood that the drying rate is high and relatively constant at high moisture ratios (constant rate period). The drying rate begins decreasing rather rapidly after reaching a certain critical moisture ratio (falling rate period) in the sheet. If a constant air permeation rate is maintained throughout the drying period, the pressure drop is also expected to decrease as the moisture ratio decreases (or as the drying process continues). The manner in which the pressure drop varies during the throughdrying process under a constant air permeation rate is of primary interest for purposes of this invention because it provides a quantitative means for measuring the air permeability of the sheet while being dried. If one can accurately measure the instantaneous absolute humidity of the outlet air after drying a tissue sample, one can readily calculate the instantaneous moisture ratio from the humidity of the outlet air and the initial and the final moisture ratios of the tissue sample as shown below:

$$X_m(t) = X_0 - (X_0 - X_{end}) \frac{\int_0^t \{Y_{out}(t) - Y_{in}\}dt}{\int_0^t eno\{Y_{out}(t) - Y_{in}\}dt}$$

wherein

"$X_0$"=the moisture ratio of the test sample at the beginning of the test, expressed as kilograms of water per kilogram of bone dry fiber;

"$X_{end}$"=the moisture ratio of the test sample at the end of the test, expressed as kilograms of water per kilogram of bone dry fiber;

"$X_m$"=the instantaneous moisture ratio of the test samples f expressed as kilograms of water per kilogram of bone dry fiber;

"$Y_{in}$" = the humidity of the drying air immediately prior to reaching the sample, expressed as kilograms of water per kilogram of dry air;

"$Y_{out}$" = the humidity of the drying air immediately after passing through the sample, expressed as kilograms of water per kilogram of dry air; and "t" = elapsed time, expressed in seconds.

Calculating the moisture ratio $X_m$ from the humidity data for the entire drying period data enables one to plot pressure drop as a function of the instantaneous moisture ratio. The inverse of the area under the resulting curve is referred to herein as the TD Index, expressed as kilopascals$^{-1}$. This index is a measure of the air permeability of the wet sheet and reflects the ease in which a paper sheet made from a particular furnish can be throughdried. Higher TD Index values reflect greater ease in throughdrying, whereas lower values reflect greater difficulty in throughdrying.

As will be described below, measurement of the TD Index requires that the fibers in question be formed into a handsheet having a basis weight of 24 grams per square meter. This is accomplished by diluting a fiber sample in water to a consistency of 2.5 weight percent in a British Pulp Disintegrator and allowing the dispersed sample to soak for 5 minutes. The sample is then pulped for 10 minutes at ambient temperature, diluted to 0.04 percent consistency, and formed into a handsheet on a British Handsheet Mold (The Hermann Mfg. Co., Lancaster, Ohio). The handsheet is couched off of the mold by hand using a blotter without applying any pressure. The handsheet is dried for 2 minutes to absolute dryness using a Valley steam hotplate and a standard weighted canvas cover having a lead filled (4.75 pounds) brass tube at one end to maintain uniform tension. The TD Index for the resulting dried handsheet is then determined as described herein and the measured TD Index value is assigned to the fibers or furnish from which the handsheet was made.

Figure 1:
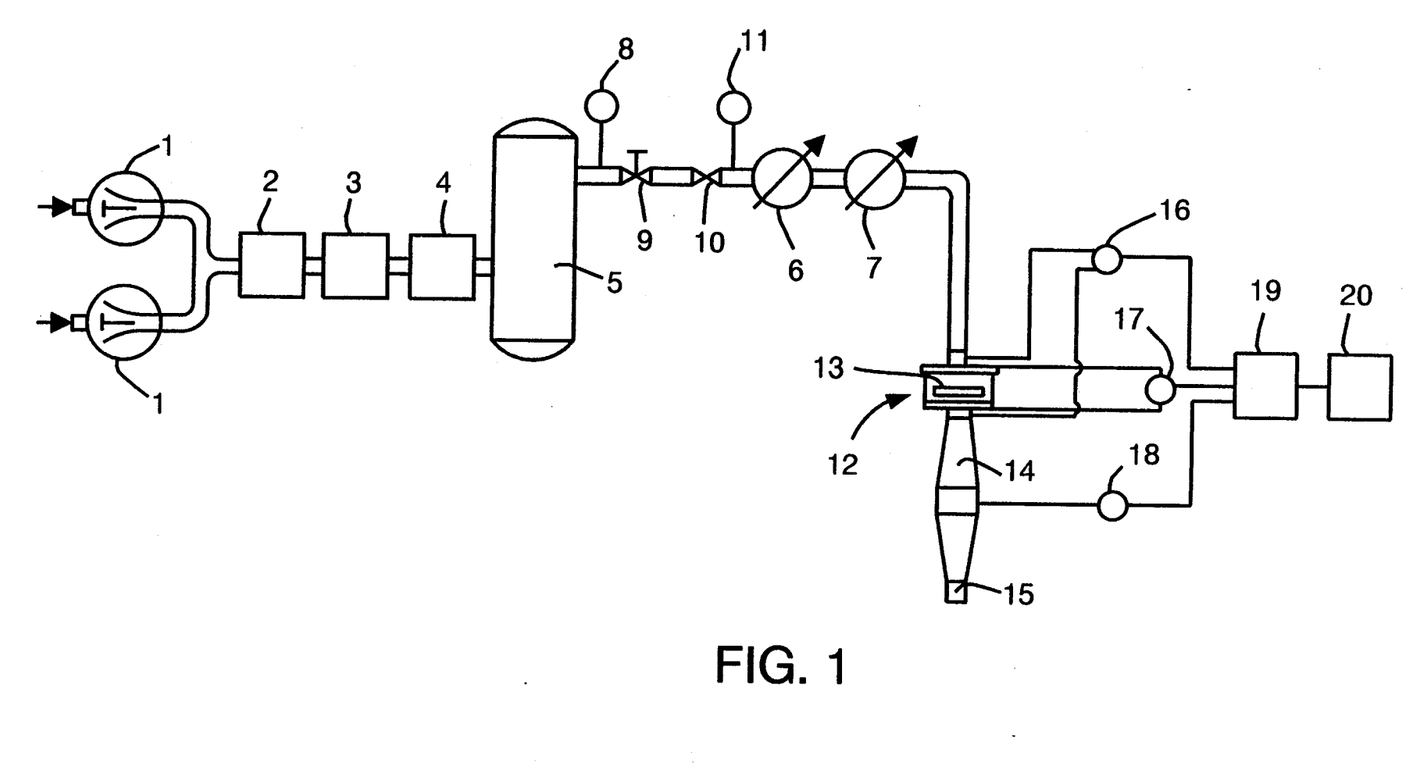
FIG. 1 is a schematic flow diagram of the apparatus used for determining the TD Index.

Referring now to FIG. 1, the apparatus for determining the TD Index will be described in greater detail. Unless otherwise specified, conduit in the mainstream of air flow has a 1.5 inch inside diameter. Air for drying the samples is provided by two "oil free" compressors 1, each rated for 29.9 cubic feet per minute at 90 psi. (Model DN 1024H-3DF, Atlas Copco, Cleveland, Ohio). The outlet of the compressors is suitably connected to the inlet of a condensed water separator 2 (Model WSO-08-000, Wilkerson, Engelwood, Colo.), which serves to remove any liquid water entrained in the air stream. The outlet of the separator is suitably connected to the inlet of a molecular sieve 3 (Model M530, Wilkerson) which serves to eliminate particulate matter in the air having a particle size greater than about 0.05 microns. The outlet of the molecular sieve is suitably connected to a compressed air dryer 4 (Wilkerson model DHA-AE-000) with an outlet flow of 49 cubic feet per minute. The outlet of the dryer is connected to the inlet of a surge tank 5 (approximately 75 cubic feet capacity). The outlet of the surge tank is suitably connected to two additional oil heat exchangers 6 and 7 (5 liter capacity/250° C. max. temp./6 bar max. pressure, Apparatebau Wiesloch GmbH, Weisloch, Germany) in series which serve to further heat the air to the desired throughdrying temperature. In between the surge tank and the two heat exchangers are a moisture monitor 8 (Aquanel, Gerhard GmbH, Blankebach, Germany), a gate-type control valve 9 (DIN R65, 1.5 inch, PN 16, Henose, Hamburg, Germany) for controlling the flow rate of the air, an orifice plate 10 (25 millimeter diameter opening, RST 37-2 PN6 DIN 2527-32-5784, University of Karlsruhe, Karlsruhe, Germany), and a manometer 11 (Betz, Gottingen, Germany), which together are used to determine the air flow rate. Other valves and piping (not shown) which are not essential to the operation of the apparatus can be present for convenience at various places to isolate or by-pass gauges and other devices. The outlet of the second heat exchanger is directly connected to a sample housing 12, which is designed to receive and hold a slidable sample tray 13 (see FIG. 2) into which a sample holder (see FIG. 2) is placed. All of the air passes through the sample placed in the sample holder. An inflatable gasket mounted within the sample housing assures a positive seal between the sample housing and the slidable sample tray when the gasket is activated. A diffuser 14 is suitably connected to the outlet of the sample housing such that the cross-sectional flow area is expanded to 11,600 square millimeters in order to slow down the air flow to facilitate more accurate moisture measurement. The diffuser is suitably connected to a vent tube which carries the air to a suitable exhaust system. A differential temperature sensor 16 (resistance type differentiation) is suitably connected to measure the temperature of the air before and after the sample. A differential pressure sensor 17 (PU 1000, 0-1000 millibar, 110 V AC) is suitably connected to measure the pressure drop across the sample. A second, more sensitive moisture monitor 18 (infrared; twenty-five measurements per second; made by Paderborn University, Paderborn, Germany) measures the moisture content of the air leaving the sample. All three sensors are linked to a Schlumberger data acquisition system 19 which is linked to a computer 20 (RMC 80286 processor) for correlating the data.

Figure 2:
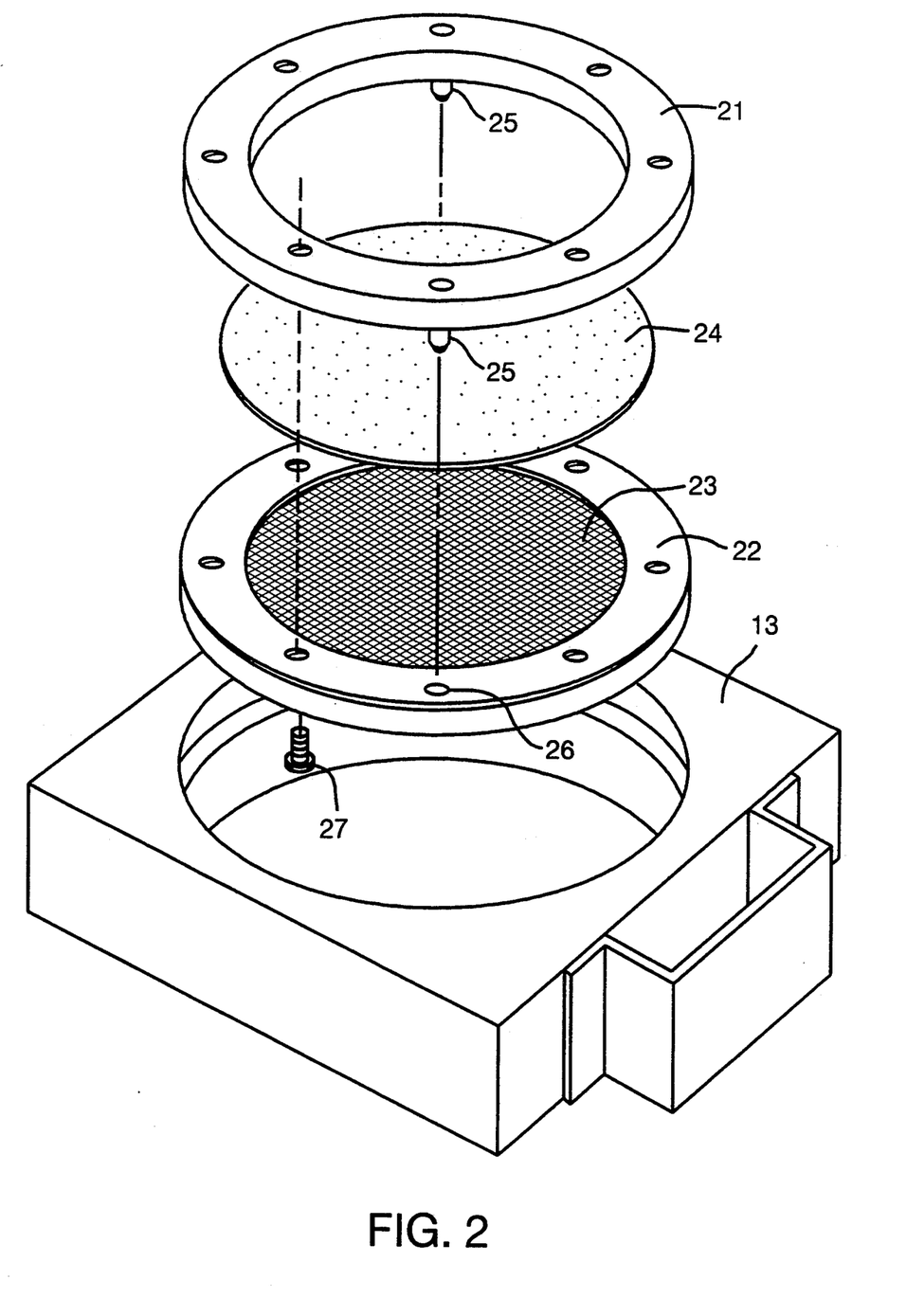
FIG. 2 is an exploded perspective view of the sample holder of the apparatus of FIG. 1, including the sliding sample tray used to place the sample holder into the drying apparatus.

FIG. 2 illustrates the sample holder and the manner in which the sample is mounted within the sample holder, including the sliding sample tray 13 adapted to hold the sample holder and slide it in and out of the sample housing. Shown in FIG. 2 is the top of the sample holder 21, which is the upstream portion, and the bottom of the sample holder 22, which is the downstream portion. The bottom of the sample holder contains a support fabric 23 (Asten 937, Asten Corporation, Appleton, Wis.) upon which the sample rests. Sandwiched in between the top and bottom is the handsheet sample 24 which has been cut to the appropriate size. A thin line of grease (not visible in this view) positioned around the inside edge of the top of the sample holder provides a seal between the sample and the top of the sample holder when the sample is secured. The top of the sample holder contains two registration pins 25 which become inserted into registration holes 26 in the bottom of the sample holder and the two halves are secured by means of six screws 27 with appropriate threaded holes.

Having identified the apparatus for determining the TD Index, the procedure for determining the TD Index can now be described. Generally speaking, to determine the TD Index for a given test sample (24 gsm handsheet), the sample is carefully wetted to a particular moisture level and dried in the apparatus described above under controlled conditions of constant air mass flow rate. The moisture level in the sample is continuously calculated by a computer, based on the humidity measurements of the air before and after the sample during the test. The measured pressure drop across the sample is plotted as a function of the calculated moisture level of the sample, and the area under the curve is the TD Index.

More specifically, the handsheet sample to be tested is cut into a 10.25 centimeter diameter circle which fits into the sample holder of the apparatus and is only slightly larger than the sample holder opening. During the test, only a 10 centimeter diameter circle of the sample is exposed to air flow. Accordingly, the portion of the circular sample outside the sample holder opening is impregnated with grease (Compound 111 Valve Lubricant and Sealant, Dow Corning Corporation, Midland, Mich.) before being wetted for the test to prevent any moisture from being wicked outside the circle as well as establishing a more positive seal between the sample and the sample holder. This is accomplished by applying and rubbing the grease around the inside edge of the top half (upstream half) of the sample holder. The sample is then placed onto the bottom half of the sample holder which contains a piece of throughdrying fabric (Asten 937) for supporting the sample. The top half of the sample holder is then clamped onto the bottom half of the sample holder, thereby impregnating the outer edge of the sample with the grease. The supported sample is then wetted by spraying with a fine mist until a moisture level of 3.0 kilograms of water per kilogram of bone dry fiber is reached. During spraying, a cover guard should be placed over the sample holder to prevent the sample holder from being sprayed and to keep all of the sprayed water directed at the 10 centimeter circle. The moisture in the sample is accurately determined by the weight difference before and after wetting.

Figure 3:
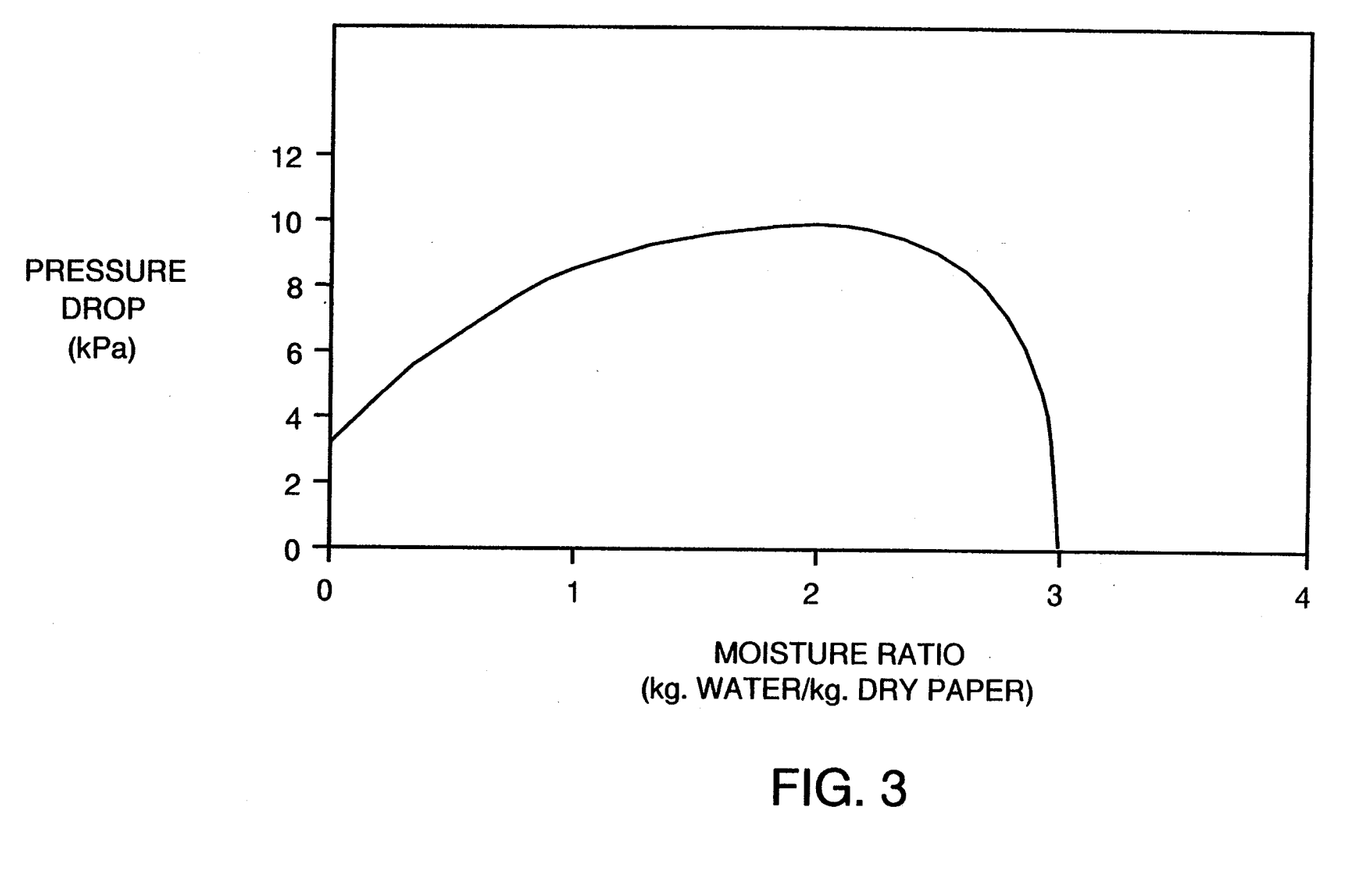
FIG. 3 is a representative depiction of a typical plot of pressure drop versus moisture ratio as generated while testing a sample using the apparatus described in FIG. 1 above.

While the sample is being prepared, the air system is turned on at a predetermined constant flow rate of 3.0 kilograms per square meter per second and heated to a temperature of 175° C. When steady state is reached, the air temperature will be steady and constant, the humidity will be zero, and the pressure drop will be zero. After the reference steady state conditions are achieved, the sample holder with the wetted test sample is placed into the sliding sample tray and slid into the sample housing of the apparatus. The humidity and the pressure drop are continuously monitored by the instruments and the computer, which provides a plot of pressure drop versus moisture ratio. A typical plot is illustrated in FIG. 3. (Note that time increases from right to left in this plot.) As shown, the pressure drop shows a very rapid initial increase and thereafter quickly starts decreasing, typically reaching a constant level in about four or five seconds. The computer then integrates the inverse of the area under the curve and calculates the TD Index as earlier described.

Figure 4:
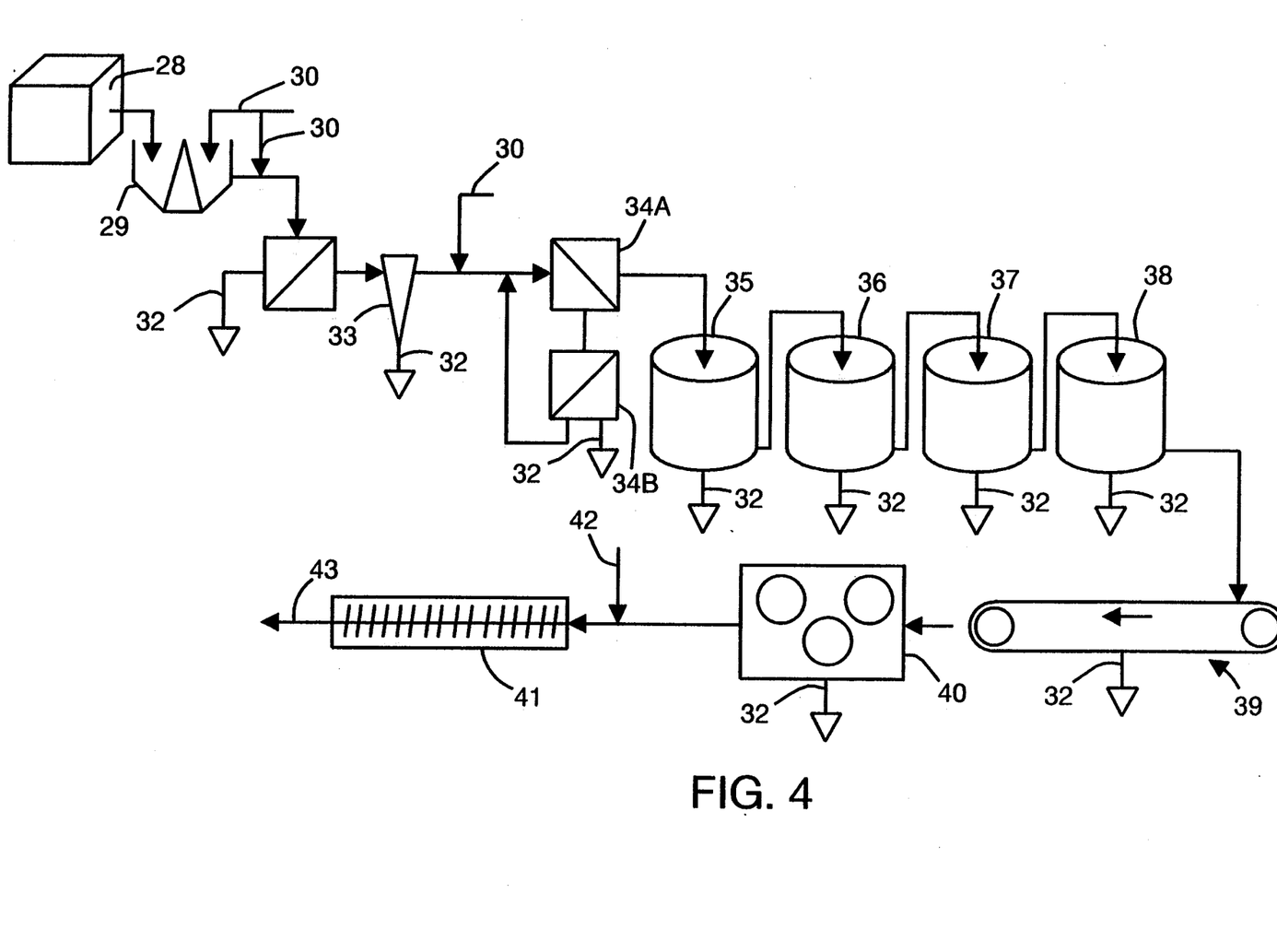
FIG. 4 is a schematic process flow diagram of a method of treating fibers in accordance with this invention using a shaft disperger to work the fibers.

FIG. 4 is a block flow diagram illustrating overall process steps for treating fibers in accordance with this invention. Shown is the paper furnish 28 to be treated being fed to a high consistency pulper 29 (Model ST6C-W, Bird Escher Wyss, Mansfield, Mass.) with the addition of dilution water 30 to reach a consistency of about 15 percent. Prior to being pumped out of the pulper, the stock is diluted to a consistency of about 6 percent. The pulped fibers are fed to a scalping screen 31 (Fiberizer Model FT-E, Bird Escher Wyss) with additional dilution water in order to remove large contaminants. The input consistency to the scalping screen is about 4 percent. The rejects from the scalping screen are directed to waste disposal 32. The accepts from the scalping screen are fed to a high density cleaner 33 (Cyclone Model 7 inch size, Bird Escher Wyss) in order to remove heavy contaminants which have escaped the scalping screen. The rejects from the high density cleaner are directed to waste disposal. The accepts from the high density cleaner are fed to a fine screen 34A (Centrisorter Model 200, Bird Escher Wyss) to further remove smaller contaminants. Dilution water is added to the fine screen feed stream to achieve a feed consistency of about 2 percent. Rejects from the fine screen are directed to a second fine screen 34B (Axiguard, Model 1, Bird Escher Wyss) to remove additional contaminants. The accepts are recycled to the feed stream to the fine screen 34A and the rejects are directed to waste disposal. The accepts from the fine screen, with the addition of dilution water to reach a consistency of about 1 percent, are then passed to a series of four flotation cells 35, 36, 37 and 38 (Aerator Model CF1, Bird Escher Wyss) to remove ink particles and stickies. Rejects from each of the flotation cells are directed to waste disposal. The accepts from the last flotation cell are fed to a washer 39 (Double Nip Thickener Model 100, Black Clawson Co., Middletown, Ohio) to remove very small ink particles and increase the consistency to about 10 percent. Rejects from the washer are directed to waste disposal. The accepts from the washer are fed to a belt press 40 (Arus-Andritz Belt Filter Press Model CPF 20 inches, Andritz-Ruthner Inc., Arlington, Tex.) to reduce the water content to about 30 percent. Pressate is directed to waste disposal. The resulting partially dewatered fibrous material is then fed to a shaft disperger 41 (GR II, Ing. S. Maule & C. S.p.A., Torino, Italy), described in detail FIG. 5, in order to work the fibers to increase the TD Index in accordance with this invention. Steam 42 is added to the disperger feed stream to elevate the temperature of the feed material. The resulting treated fibers 43 can be directly used as feedstock for papermaking or otherwise further treated as desired.

Figure 5:
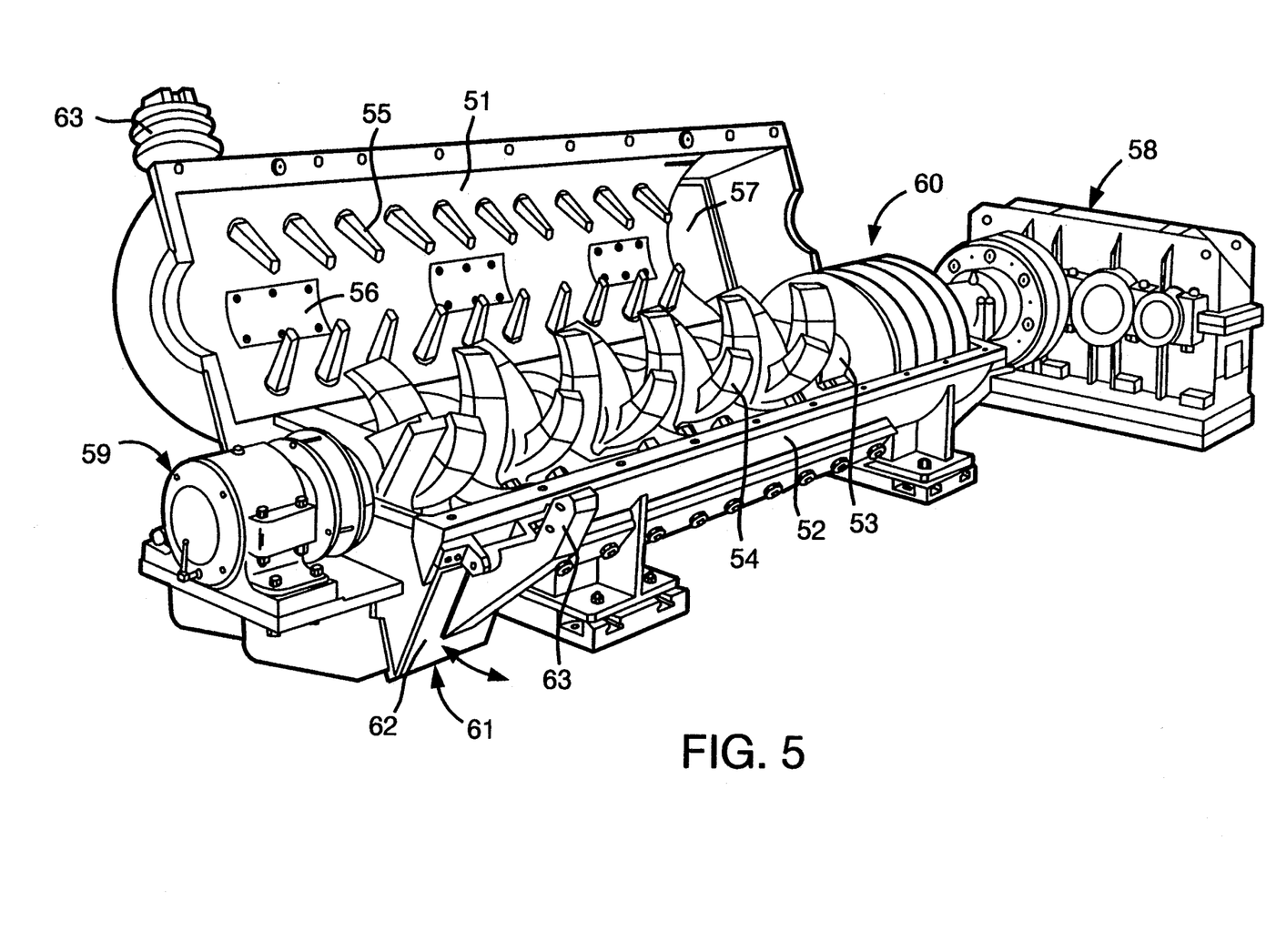
FIG. 5 is a cut-away perspective view of the shaft disperger of FIG. 4.

FIG. 5 is a cut-a-way perspective view of a preferred apparatus for treating fibers in accordance with this invention as illustrated in FIG. 4. The particular apparatus is a shaft disperger, type GR II, manufactured by Ing. S. Maule & C. S.p.A., Torino, Italy. Shown is an upper cylindrical housing 51 and a lower cylindrical housing 52 which, when closed, enclose a rotating shaft 53 having a multiplicity of arms 54. The upper housing contains two rows of knurled fingers 55 and three inspection ports 56. At one end of the upper housing is an inlet port 57. At the inlet end of the rotating shaft is drive motor 58 for turning the shaft. At the outlet end of the rotating shaft is a bearing housing 59 which supports the rotating shaft. The inlet end of the rotating shaft contains a screw feed section 60 which is positioned directly below the inlet and serves to urge the feed material through the disperger. The outlet 61 of the disperger comprises a hinged flap 62 having a lever 63 which, when the disperger is closed up, is engaged by hydraulic air bags 63 mounted on the upper housing. The air bags provide controllable resistance to the rotation of the hinged flap and hence provide a means of controlling the back pressure within the disperger. Increasing the back pressure increases the degree to which the fibers are worked and thereby increases the TD Index. During operation, the knurled fingers interdigitate with the arms of the rotating shaft to work the feed material therebetween.

Figure 6:
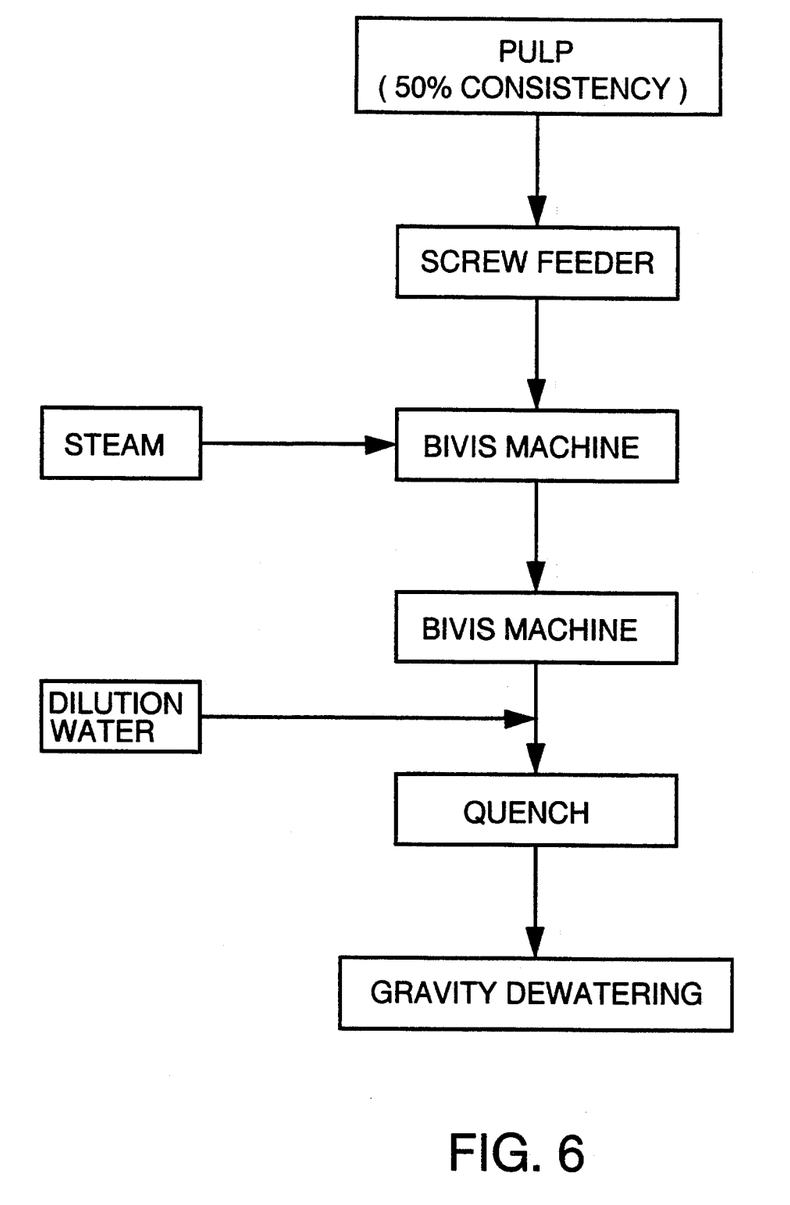
FIG. 6 is an alternative schematic process flow diagram of a method in accordance with this invention using a pair of Bivis machines in series.

FIG. 6 is a block flow diagram of an alternative process of this invention utilizing a pair of Bivis machines. As illustrated, papermaking pulp, preferably secondary fiber pulp, at a consistency of about 50 percent, is fed to a screw feeder. The screw feeder meters the feedstock to the first of two Bivis machines in series. Each Bivis machine has three compression/expansion zones. Steam is injected into the first Bivis machine to raise the temperature of the fibers to about 212° F. The worked pulp is transferred to the second Bivis machine operating at the same conditions as the first Bivis machine. The worked pulp from the second machine can be quenched by dropping it into a cold water bath and thereafter dewatered to a suitable consistency.

EXAMPLES

Having described the TD Index and the method of carrying out this invention, the invention will now be further described in detail with reference to the following examples.

EXAMPLE 1

Secondary fiber (office waste grade) was treated by the process described in FIG. 4. Specifically, the secondary fiber was repulped at a consistency of 15%, cleaned, pressed to a pre-disperger consistency of 22.9%, then fed to a Maule shaft disperger as illustrated in FIG. 5. The disperger was maintained at a temperature of 175° F. Power input to the disperger was approximately 1.39 horsepower-day per ton of fiber (HPD/T). Pre- and post-disperger samples were taken and made into dry 24 gsm. handsheets per the previously defined method. Measurement of the TD Index was carried out as previously described. The results are set forth in Table 1 below. (The "TD" is the Throughdryability Index, expressed as kilopascals$^{-1}$. The "Tensile" is the tensile strength, expressed as grams per inch of sample width. The "Tear" is the Elmendorf tear strength, expressed as grams-force per four sheets. The "Caliper" thickness, expressed as inches. The "TEA" is the tensile energy absorbed, expressed as gram-centimeters per square centimeter.)

TABLE 1

| Sample | TD | Tensile | Tear | Caliper | TEA |
| --- | --- | --- | --- | --- | --- |
| Pre-disperger | 0.11 | 1274 | 18.0 | 0.0058 | 8.1 |
| Post-disperger | 0.30 | 739 | 17.2 | 0.0076 | 3.8 |

EXAMPLE 2

The same secondary fiber material was treated as described in Example 1, except the disperger temperature was 175° F., the predisperger consistency was 34.7 percent, and the power input to the disperger was 2.12 HPD/T. Pre- and post-disperger samples were taken as before and formed into handsheets as previously described. The results are set forth in Table 2.

TABLE 2

| | TD | Tensile | Tear | Caliper | TEA |
| --- | --- | --- | --- | --- | --- |
| Pre-disperger | 0.12 | 1278 | 18.0 | 0.0060 | 6.6 |
| Post-disperger | 0.53 | 585 | 14.0 | 0.0082 | 2.5 |

EXAMPLE 3

The same secondary fiber material was treated as described in Example 1, except the disperger temperature was 150° F., the pre-disperger consistency was 34.6%, and the power input to the disperger was 2.15 HPD/T. Pre- and post-disperger samples were taken as before and formed into handsheets as previously described. The results are set forth in Table 3.

TABLE 3

| | TD | Tensile | Tear | Caliper | TEA |
| --- | --- | --- | --- | --- | --- |
| Pre-disperger | 0.14 | 1334 | 19.2 | .0060 | 7.9 |
| Post-disperger | 0.37 | 884 | 18.0 | .0070 | 4.9 |

EXAMPLE 4

The same secondary fiber material was treated as described in Example 1, except the disperger temperature was 81° F., the pre-disperger consistency was 26.8% and the power input to the disperger was 2.44 HPD/T. Pre- and post-disperger samples were taken as before and formed into handsheets as previously described. The results are set forth in Table 4.

TABLE 4

| | TD | Tensile | Tear | Caliper | TEA |
| --- | --- | --- | --- | --- | --- |
| Pre-disperger | 0.10 | 1409 | 19.6 | .0055 | 8.3 |
| Post-disperger | 0.17 | 1125 | 20.0 | .0062 | 6.7 |

EXAMPLE 5

The same secondary fiber material was treated as described in Example 1, except the disperger temperature was 79° F., the pre-disperger consistency was 34.6% and the power input to the disperger was 1.18 HPD/T. Pre- and post-disperger samples were taken as before and formed into handsheets as previously described. The results are set forth in Table 5.

TABLE 5

| | TD | Tensile | Tear | Caliper | TEA |
| --- | --- | --- | --- | --- | --- |
| Pre-disperger | 0.10 | 1322 | — | .0055 | 5.7 |
| Post-disperger | 0.14 | 1189 | 22.4 | .0060 | 6.7 |

EXAMPLE 6

The same secondary fiber material was treated as described in Example 1, except the disperger temperature was 78° F., the pre-disperger consistency was 37.1% and the power input to the disperger was 2.95 HPD/T. Pre- and post-disperger samples were taken as before and formed into handsheets as previously described. The results are set forth in Table 6.

TABLE 6

| | TD | Tensile | Tear | Caliper | TEA |
| --- | --- | --- | --- | --- | --- |
| Pre-disperger | 0.10 | 1435 | 20.0 | .0055 | 8.1 |
| Post-disperger | 0.19 | 1155 | 21.6 | .0064 | 6.1 |

EXAMPLE 7

Well-washed secondary fiber at approximately 50% consistency was fed in crumb form to a Bivis machine (Clextral Company, Firminy Cedex, France) via a screw feeder as illustrated in FIG. 6. The Bivis refiner is a twin screw refining mechanism with a machined inner compartment in which the screws are situated such that the screw flights on both shafts are in proximity to each other. Steam was introduced into the interior compartment to raise the pulp temperature to approximately 105° C. As the pulp was fed into the Bivis, the screws rotated in the same direction, and the flights were angled to force the pulp to traverse the long axis of the machine. Periodically along the screw shaft, the direction of the flights was reversed. This orientation of the flights forced the pulp to reverse its direction of travel, resulting in back pressure. The reversed flights had small slots machined in them so that the resulting pressure forced the pulp to extrude through the slots. The compression/expansion action of the reversed screw flights, in combination with the inter-fiber friction caused by the high consistency of the pulp and the proximity to the flights on adjacent screw shafts, caused significant fiber working. The product from the first Bivis unit was sent to a second Bivis unit operated under the same conditions. From the second Bivis, the pulp was sent to a quench tank at 10° C. The pulp was then gravity dewatered to produce the final product. This treated pulp was made into 24 gsm handsheets as previously described and the TD Index was determined as previously described. The results are set forth in Table 7.

TABLE 7

|  | TD | Tensile | Tear | Caliper | TEA |
|---|---|---|---|---|---|
| Pre-Bivis | 0.08 | 1072 | 18.5 | .0061 | 5.65 |
| Post-Bivis | 0.71 | 388 | 10.5 | .0079 | 1.28 |

The results from the foregoing examples illustrate that the Throughdryability Index of secondary fibers can be dramatically increased (and hence the throughdrying behavior of the fibers can be improved) by subjecting the fibers to appropriate working forces at high consistency in a disperger. Also, the application of high consistency working forces improves the tissue making character of the fibers by decreasing the tensile and tearing strengths while increasing bulk.

EXAMPLE 8

Cenibra eucalyptus fibers were pulped for 15 minutes at 10% consistency and dewatered to 30% consistency. A softening agent (Berocell 584) was added to the pulp in the amount of 10 lb. Berocell per ton dry fiber, and the pulp was then fed to a Maule shaft disperger as illustrated in FIG. 5. The disperger was operated at 160° F. with a power input of 2.2 HPD/T.

The resulting disperged eucalyptus fibers were made into a two-layered tissue having a softwood fiber layer and a eucalyptus fiber layer. Prior to formation, the northern kraft softwood fibers (LongLac-19) were pulped for 60 minutes at 4% consistency, while the disperged eucalyptus fibers were pulped for 2 minutes at 4% consistency. Each layer was independently formed on separate forming Fabrics at 0.05% consistency at a speed of about 50 feet per minute and the resulting two webs were couched together at approximately 10% consistency to form a two-layered web. The resulting layered web was transferred to a papermaking felt and thereafter pressed onto the surface of a Yankee dryer, where the web was dried and creped at a 1.3 crepe ratio. The dryer side of the layered web was composed entirely of the softwood fibers and had a basis weight of 7.25 lb./2880 ft$^2$ (dryer basis weight). The air side of the layered web was composed entirely of the disperged eucalyptus fibers of equal basis weight. After creping, the tissue was wound into bath rolls under minimum draw.

The resulting tissue had the following properties: tensile strength=858 grams per 3 inches width (machine direction) and 488 grams per 3 inches width (cross-machine direction); stretch: 30.4% (machine direction) and 5.8% (cross-machine direction); Panel Softness=7.70. (Panel Softness is determined by a trained sensory panel which rates tissues for softness on a scale of from 0 to about 9.5.) For comparison, a typical softness value for throughdried material at similar strength is 7.15.

EXAMPLE 9

Southern hardwood kraft fibers (Coosa River-59) were pulped for 15 minutes at 10% consistency and dewatered to 28% consistency. A debonder (Berocell 584) was added to the pulp in the amount of 10 lb. Berocell per ton dry fiber. The pulp was then fed to a Maule shaft disperger. The disperger was operated at 160° F. with a power input of 2.2 HPDTT.

The resulting disperged hardwood fibers were made into a two-layered tissue having a softwood layer and a hardwood layer. Specifically, northern softwood kraft fibers (LongLac-19) were pulped for 60 minutes at 4% consistency, while the disperged hardwood fibers were pulped for 2 minutes at 4% consistency. Each layer was independently formed on separate forming fabrics at 0.05% consistency and the resulting webs were couched together at about 50 feet per minute at approximately 10% consistency to form a single layered web. The resulting layered web was transferred to a papermaking felt and thereafter pressed onto the surface of a Yankee dryer, where the web was dried and creped at a 1.3 crepe ratio. The dryer side of the layered web was composed entirely of softwood fibers and had a basis weight of 7.25 lb./2880 ft$^2$ (dryer basis weight). The air side of the web was composed entirely of the disperged hardwood fibers of equal basis weight. After creping, the tissue was wound into bath tissue rolls under minimum draw.

The resulting tissue had the following properties: tensile strength=689 grams per 3 inches width (machine direction) and 466 grams per 3 inches width (cross-machine direction); stretch=32% (machine direction) and 5.6% (cross-machine direction); Panel Softness=7.65. For comparison, a typical softness value for throughdried material at similar strength is 7.30.

Examples 8 and 9 both illustrate the softness advantages of treating virgin hardwood fibers with a disperger in accordance with the method of this invention for making wet-pressed tissues.

It will be appreciated that the foregoing examples, given for purposes of illustration, are not to be construed as limiting the scope of this invention, which is defined by the following claims.

I claim:

1. A method for making tissue comprising (a) forming an aqueous suspension comprising papermaking fibers having a consistency of from about 30 to about 50 percent; (b) passing the aqueous suspension through a shaft disperger having a rotating shaft with a multiplicity of arms which work the fibers substantially by fiber-to-fiber contact, wherein the temperature of the aqueous suspension is about 150° F. or greater and the power input is about 1 horsepower-day per ton of dry fiber or greater, wherein the TD Index of the fibers is increased about 25 percent or greater; (c) feeding the fibers through a tissue making headbox to form a wet web; and (d) drying the web to form a dried tissue.

2. The method of claim 1 wherein the TD Index is increased about 50 percent or greater.

3. The method of claim 1 wherein the TD Index is increased about 75 percent or greater.

4. The method of claim 1 wherein the temperature is about 210° F. or greater.

5. The method of claim 1 wherein the temperature is about 220° F. or greater.

6. The method of claim 1 wherein the power input is about 2 horsepower-days per ton of fiber or greater.

7. The method of claim 1 wherein the papermaking fibers are secondary fibers.

8. The method of claim 1 wherein the papermaking fibers are virgin hardwood fibers.

9. The method of claim 1 wherein a softening agent is added to the aqueous suspension of papermaking fibers prior to passing the suspension through the shaft disperger.

10. The method of claim 1 wherein a softening agent is added to the aqueous suspension after the suspension has passed through the shaft disperger.

11. The method of claim 1 wherein the wet web is throughdried.

12. A method for making throughdried tissue comprising (a) forming an aqueous suspension comprising secondary fibers having a consistency of from about 30 to about 50 percent; (b) passing the aqueous suspension through a shaft disperger having a rotating shaft with a multiplicity of arms which work the fibers substantially by fiber-to-fiber contact, wherein the temperature of the aqueous suspension is about 150° F. or greater and the power input is about 1 horsepower-day per ton of dry fiber, wherein the TD Index of the fibers is increased to about 0.15 or greater; (c) feeding the fibers through a tissue making headbox to form a wet web; and (d) throughdrying the web to form a throughdried tissue.

13. The method of claim 12 wherein the resulting fibers from step (b) have a TD Index of about 0.2 or greater.

14. The method of claim 12 wherein the resulting fibers from step (b) have a TD Index of about 0.3 or greater.

15. The method of claim 12 wherein the resulting fibers from step (b) have a TD Index of about 0.5 or greater.

16. The method of claim 12 wherein the temperature is about 210° F. or greater.

17. The method of claim 12 wherein the temperature is about 220° F. or greater.

18. The method of claim 12 wherein the power input is about 2 horsepower-days per ton of dry fiber.

* * * * *

UNITED STATES PATENT AND TRADEMARK OFFICE
CERTIFICATE OF CORRECTION

PATENT NO. : 5,348,620

DATED : September 20, 1994

INVENTOR(S) : M. A. Hermans et al.

It is certified that error appears in the above-identified patent and that said Letters Patent is hereby corrected as shown below:

On title page, item [75],
In the Inventors:, delete "Kristin A. Goerg" and substitute therefor --Kristin A. Goerg-Wood--.

Column 3, line 41, delete "HPDZT" and substitute therefor --HPD/T--.

Column 3, line 42, delete "HPDZT" and substitute therefor --HPD/T--.

Column 4, the figure, app. line 57, dele "eno" and substitute therefor --end--.

Column 8, line 31, insert "in" between "detail" and "FIG. 5."

Column 9, line 37, insert "is" between "Caliper" and "thickness."

Column 12, line 14, delete "HPDTT" and substitute therefor --HPD/T--.

Signed and Sealed this

Second Day of January, 1996

*Attest:*

BRUCE LEHMAN

*Attesting Officer*     *Commissioner of Patents and Trademarks*